United States Patent [19]

Sarna et al.

[11] Patent Number: 4,873,426
[45] Date of Patent: Oct. 10, 1989

[54] TECHNIQUE FOR READING BAR CODES

[75] Inventors: David E. Y. Sarna, Teaneck, N.J.; Daniel Mailick, New Rochelle, N.Y.

[73] Assignee: Image Business Systems Corporation, New York, N.Y.

[21] Appl. No.: 227,826

[22] Filed: Aug. 3, 1988

[51] Int. Cl.⁴ ............................................... G06K 7/10
[52] U.S. Cl. ..................................... 235/462; 235/463
[58] Field of Search ................................. 235/462, 463

[56] References Cited

U.S. PATENT DOCUMENTS 4,578,570 3/1986 Mazumder ........................... 235/463

Primary Examiner—Harold I. Pitts
Attorney, Agent, or Firm—Frishauf, Holtz, Goodman & Woodward

[57] ABSTRACT

A technique for reading a bar code representative of message information is stored electronically in bit-map form. The bit map is obtained by optically scanning a document carrying non-bar code information also to convert pixel information into bit information. A row is identified in the bit map which is the most likely one to pass through an area in the bit map containing bar code information. The data stored in the bit map is compared with assigned data corresponding to designated bar code components. Once such a row is identified, processing of rows above and below it in the bit map reveals whether rows more likely to agree with the coded message information can be found. Initially, a fast processing mode is selected involving processing of only a few rows to maximize processing speed in case acceptable data can be found. If acceptable bar code data is not found, then the processing is switched into a slow processing mode which involves processing of a greater number of rows. Once a row likely to contain the bar code data of interest is identified, the information it contains is converted into signals which are used for converting the coded bar code data into the message represented thereby.

52 Claims, 7 Drawing Sheets

TECHNIQUE FOR READING BAR CODES

FIELD OF THE INVENTION

This invention is directed to a technique for reading bar codes to determine the alphanumeric information represented thereby and, in particular, for identifying bar code data included along with other data in a bit map, and for processing the bar code data in the bit map to produce the corresponding alphanumeric information.

Bar codes have come into ever increasing usage in recent years for a growing number of diverse applications. Such a code corresponds closely to computer machine language and, therefore, readily lends itself to computer data processing. A bar code symbol includes a plurality of rectangular components such as alternating dark and light bars arranged into a pattern which represents letters, numerals, and perhaps other human-readable symbols. The entire symbol can represent one character or a plurality of characters, as needed. Various types of bar codes, each with its own specific rules and patterns, are available. Each of these types is capable of symbolizing a plurality of different characters.

Typically, the dark bars are printed onto a light-reflective surface such as paper, with the light bars simply being the spaces between a pair of dark bars. The encoded message in the bar code symbol can be based on such variables as the number of dark bars, the relative positions of the dark bars within the bar code, the variable width of the dark bars, the variable width of the light bars, and the relative positions of the light bars within the bar code.

Known techniques for reading bar codes utilize a device that emits a narrow beam of light, and which is passed over the entire bar code to sense the amount of light reflected by each of the bar code components. Such a device is typically a wand manipulated manually or a laser beam operated automatically. The spatially organized bar code pattern is converted from space domain to time domain by the swept light beam. An algorithm recognizes transitions between high and low outputs corresponding to the degree of light reflected by the bar code components, and determines the relative times at which such transitions occur. The resulting pulse width pattern is processed by comparing the width of the obtained pulses relative to each other in order to read the bar code. The sweep velocity is immaterial (within limits), as long as it is constant, because ratios rather than absolute values of the pulse widths are used. The HANDBOOK OF BAR CODING SYSTEMS by Harry E. Burke available from Van Nostrand Reinhold Co. and the publication titled "American National Standard for Materials Handling - Bar Code Symbols on Unit Loads and Transport Packages" available from the American National Standards Institute ("ANSI") as document MH10.8M-1983 provide more detailed information on types of bar codes, how they are utilized, and the related print and read technologies.

In more recent times, various applications have been found which require scanning a document carrying alphanumeric characters in the form, for example, of text, some of which may be typed and some of which may be handwritten. Some examples of such documents are completed insurance forms, voter registration cards, and postal routing slips. Such documents include standard, typewritten text, handwritten information, and a signature. Modern optical scanning technology and associated equipment has made it possible to scan such documents with a satisfactory degree of resolution, and to store the resulting signals in memory in the form of a bit map, for example, for later retrieval and use. As is well known, a bit map is an array of rows and columns of addressable memory locations corresponding, respectively, to an image defined by an array of picture elements ("pixels"). Data represented by at least one binary digit ("bit") in the bit map represents a parameter characteristic of a respective pixel.

It is desirable to utilize bar codes on documents of interest for any one of a number of reasons to, for example, facilitate their identification, classification, processing, utilization, storage, interpretation, and retrieval with minimal human intervention. In order to enable high speed unattended scanning, either an optical character reader ("OCR") or a bar code reading apparatus is needed. A bar code is preferable to the use of a human readable character scanned with an OCR to convey information to a computer with a bit-map-based approach because of the relatively shorter processing time required for a bar code.

When a bar code symbol is included within a document containing other information, the problem is how to, firstly, distinguish and locate the particular bits in the bit map which correspond to the bar code, and secondly, to then read the thus located bar code symbol from data in the bit map. These problems are exacerbated by the fact that a document may become tilted, or skewed, somewhat within the scanning equipment relative to the scanning direction. Therefore, the bar code which is detected depends on the scanning line, or corresponding bit map row, which is used.

FIG. 1A depicts surface 3 with an exemplary bar code symbol 2 printed on it. Bar code symbol 2 is tilted at an angle A to scanning direction 4 which is the direction swept by the scanning light beam, as explained above. Each of scanning lines 6–11 is composed of pixels. The number of pixels in a scanning line depends on the resolution of the apparatus used. Due to the tilt of the bar code, the corresponding bit map rows will include none or only a portion of the bar code, e.g., rows 6 and 7, respectively. Consequently, the bar code reading technique must ensure that an appropriate row or rows of the bit map are processed, such as row 10, in order to provide an accurately decoded message. This problem is, of course, not encountered by prior art techniques that have as a basic presumption that the entire bar code is scanned and which do not begin with a bit-mapped image, particularly one that includes information other than the bar code.

SUMMARY OF THE INVENTION

It is a primary object of the present invention to provide a bar code reading technique which can identify the location of a bar code symbol within a bit map.

It is another object of the present invention to provide a bar code reading technique which can read a bar code symbol available in the form of a bit map.

Another object of the present invention is to provide a bar code reading technique with increased flexibility.

Yet another object of the present invention is to provide a bar code reading technique that can read a bar code symbol stored in bit map form quickly, accurately and reliably.

Still another object of the present invention is to provide a bar code reading technique that can be utilized with a variety of different bar code types.

These and other objects of the present invention are attained in accordance with one aspect of the present invention by a bar code apparatus for processing digitized bar code data stored electronically in bit map form and representative of a bar code having parallel bar code components including alternating dark bars and blank spaces carried on a light reflective surface. The bar code data is obtained by scanning the surface in lines along a primary scanning direction substantially perpendicular to the bar code components and at a resolution of a predetermined number of pixels per unit length to generate for a line of the pixels respective bar code signals having values related to the amount of light reflected by the dark bars and blank spaces, respectively. Scanning also takes place in a secondary scanning direction substantially perpendicular to the primary scanning direction to traverse a plurality of the scanning lines at a resolution of a predetermined number of lines per unit length. The bit map is produced from the bar code signals to have a plurality of bits arranged in rows. These rows correspond, respectively, to the scanning lines, and the bits in each row correspond to the pixels in a corresponding one of the scanning lines. The bit map bits have a bit value related to the bar code signal value of the corresponding pixels. A memory means stores assigned bar code component data related to a number of bits allotted, respectively, in a row of the bit map to the bar code components. A comparison means compares the bit map with the stored bar code component data to identify the bar code components in the bit map. A conversion means provides from the identified bar code components a bar code reading result for converting the bar code to the message it represents.

Another aspect of the present invention is directed to apparatus for determining a bar code from a bit map obtained by a plurality of optically scanned lines of a light reflective surface area. At least part of the surface area carries the bar code having components including alternating dark bars and blank spaces representative of selected message information. The surface are is scanned with a resolution of a predetermined number of pixels per unit length to input data into the bit map related to light reflected by respective pixels of the surface. The bit map has a plurality of bits arranged in rows, the rows corresponding, respectively, to the scanning lines, and the bits in each row corresponding to the pixels in a corresponding one of the scanning lines. A means is provided for storing assigned bar code component data related to a number of bits allotted, respectively, in a row of the bit map to the bar components. At least two rows in thed bit map are designated for processing. The at least two designated rows are compared with the assigned bar code component data to provide an identified bar code component signal. The longest string of consecutive bar code components is identified for each of the designated rows. Whichever of the designated rows has the longest string of consecutive bar code components is selected for obtaining therefrom a bar code reading result for converting the bar code to the selected message information.

Yet another aspect of the present invention is directed to a bar code reading apparatus comprising means for optically detecting a bar code with which selected message information has been converted into a coded version, such bar code having parallel bar code components including alternating dark bars and blank spaces carried on a light reflective surface. The detecting means scans the surface in lines along a primary scanning direction substantially perpendicular to the bar code components and at a resolution of a predetermined number of pixels per unit length to generate for a line of such pixels respective bar code signals having values related to the amount of light reflected by the dark bars and blank spaces, respectively. The detecting means moves in a secondary scanning direction substantially perpendicular to the primary scanning direction to traverse a plurality of the scanning lines at a resolution of a predetermined number of lines per unit length. A means is coupled to the detecting means for producing from the bar code signals a bit map having a plurality of bits arranged in rows, such rows corresponding, respectively, to the scanning lines, and the bits in each row corresponding to the pixels in a corresponding one of the scanning lines. The bit map bits have a bit value related to the bar code signal value of the respective corresponding pixels. A memory means is provided for storing assigned bar code component data related to a number of bits allotted, respectively, in a row of the bit map to the bar code components. A means is provided for comparing the bit map with the stored bar code component data to identify the bar code components in the bit map. The, the identified bar code components are used to generate a bar code reading result for converting the bar code to the selected message information.

Still another aspect of the invention is directed to a method for processing digitized bar code data stored electronically in bit map form and representative of a bar code having parallel bar code components including alternating dark bars and blank spaces carried on a light reflective surface. The bar code data is obtained by scanning the surface in lines along a primary scanning direction substantially perpendicular to the bar code components and at a resolution of a predetermined number of pixels per unit length to generate for a line of the pixels respective bar code signals having values related to the amount of light reflected by the dark bars and blank spaces, respectively, and also scanning in a secondary scanning direction substantially perpendicular to the primary scanning direction to traverse a plurality of scanning lines at a resolution of a predetermined number of lines per unit length. The bit map is produced from the bar code signals and has a plurality of bits arranged in rows, such rows corresponding, respectively, to the scanning lines, and the bits in each row corresponding to the pixels in a corresponding one of the scanning lines. The bit map bits have a bit value related to the bar code signal value of the corresponding pixels. Assigned bar code component data is stored which is related to a number of bits allotted, respectively, in a row of the bit map to the bar code components. The bit map is compared with the stored bar code component data to identify the bar code components in the bit map. A bar code reading result is provided from the identified bar code components for converting the bar code to the message it represents.

One other aspect of the present invention is directed to a method for determining a bar code from a bit map obtained by a plurality of optically scanned lines of a light reflective surface area, at least part of which carries the bar code having components including alternating dark bars and blank spaces representative of selected message information. The surface is scanned with a resolution of a predetermined number of pixels per unit length to input data into the bit map related to light reflected by respective pixels of the surface, such bit map having a plurality of bits arranged in rows, such rows corresponding, respectively, to the scanning lines, and the bits in each row corresponding to the pixels in a corresponding one of the scanning lines. Assigned bar code component data is stored which is related to a number of bits allotted, respectively, in a row of the bit map to the bar components. At least two rows are designated in the bit map for further processing. Then, the at least two designated rows are comoared with the assigned bar code component data to provide an identified bar code component signal. The longest string of consecutive bar code components for each of said designated rows is identified. Whichever of the designated rows has the longest string of consecutive bar code components is selected. Then, a bar code reading result is obtained from the selected designated row for converting the bar code to the selected message information.

A still further aspect of the present invention is directed to a method for reading a bar code comprising the steps of optically detecting a bar code with which selected message information has been converted into a coded version, such bar code having parallel bar code components including alternating dark bars and blank spaces carried on a light reflective surface. The surface is scanned in lines along a primary scanning direction substantially perpendicular to the bar code components and at a resolution of a predetermined number of pixels per unit length to generate for a line of the pixels respective bar code signals having values related to the amount of light reflected by the dark bars and blank spaces, respectively. Scanning is also performed in a secondary scanning direction substantially perpendicular to the primary scanning direction to traverse a plurality of scanning lines at a resolution of a predetermined number of lines per unit length. A bit map is produced from the bar code signals having a plurality of bits arranged in rows, such rows corresponding, respectively, to the scanning lines, and the bits in each row corresponding to the pixels in a corresponding one of the scanning lines. The bit map bits have a bit value related to the bar code signal value of the respective corresponding pixels. Assigned bar code component data is stored which is related to a number of bits allotted, respectively, in a row of the bit map to the bar code components. The bit map is compared with the stored bar code component data to identify the bar code components in the bit map. A bar code reading result is provided from the identified bar code components for converting the bar code to the selected message information.

DETAILED DESCRIPTION OF THE PREFERRED EMBODIMENT

Figure 1:
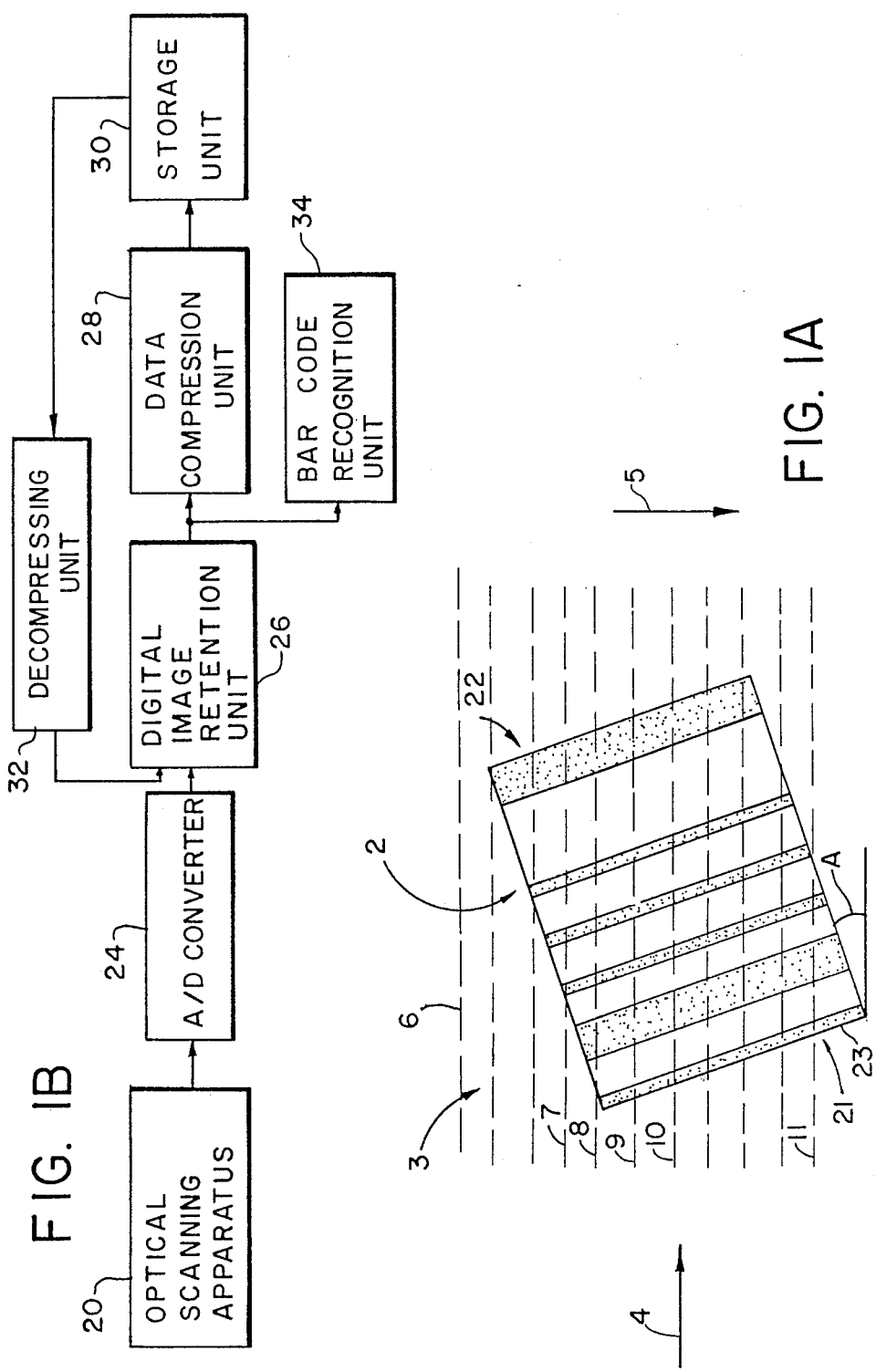
FIG. 1A shows a bar code tilted at an angle relative to a scanning direction.
FIG. 1B is a block diagram of a system for scanning, interpreting and storing bar codes.

FIG. 1B shows in block diagram form a system capable of implementing the bar code reading technique of the present invention. More specifically, optical scanning apparatus 20 provides a scanned image of a surface upon which the bar code is printed. The surface is typically a light-reflective surface such as white paper. Scanning apparatus 20 can take the form of, for example, a laser scanner, a facsimile device, or a CCD camera. Whichever of these device is utilized, it has a resolution of a preselected number of pixels per unit length, such 200 pixels per inch, along a primary scanning direction (such as 4 in FIG. 1A) with which the bar code can be scanned from its beginning portion 21 to its end portion 22 (see FIG. 1A). The resolution also depends on the number of scanning lines per unit length along a secondary scanning direction 5 (see FIG. 1A). Resolutions along the primary and secondary scanning directions need not be the same, although normally they are. Apparatus for performing this function is conventional and well known in the art. Accordingly, it is deemed unnecessary to provide further details about it.

As the image on the surface is scanned, a reading is obtained for each pixel in a scanning line. The reading provides a signal corresponding to the amount of reflected light which is detected from that pixel. A resulting analog signal is obtained for the scanning line the amplitude of which varies in response to the amount of detected light per pixel. The amount of reflected light is affected not only by the printed bar code, but also by printing imperfections, paper surface imperfections, dust and dirt.

The analog signals output by optical scanning apparatus 20 are converted into binary information by analog-to-digital ("A/D" hereinafter) converter 24. Consequently, a stream of 0's and 1's represent the detected light for the pixels in each scanning line on the scanned surface. A/D converter 24 is also a conventional unit, and no further details about it are deemed necessary.

The digitized information from A/D converter 24 is input to digital image retention unit 26. Unit 26 is typically a memory such as a RAM within a digital computer. A bit map is retained in unit 26 and logically arranged in bit rows corresponding, respectively, to the above-mentioned scan lines. At least one bit in a row of the bit map corresponds to a pixel in a scan line. (For the ensuing discussion, a 1:1 correspondence between the two is assumed). Each row of the bit map corresponds to a scan line. Each bit is stored in an addressable memory location and is, thus, retrievable, or readable, therefrom under program control.

Data compression unit 28 is a conventional device which reduces the amount of data obtained from A/D converter 24, without compromising data integrity, so that less memory capacity is required to store the scanned image in a storage unit 30. Storage unit 30 can include, for example, a magnetic tape, magnetic disc, or optical devices such as an optical worm. Both units 28 and 30 are of a conventional and well known type, so that no further information about it is deemed necessary.

Decompression unit 32 receives the data stored in storage unit 30 and converts it into its original digitized form for input to unit 26. Unit 32 is also a conventional apparatus about which further details are not required.

So far, the described system is one which is well known for scanning documents and storing the resulting information. The departure of the present invention from this prior art technique lies in its capability for, in particular, processing retained bit map information representing a bar code symbol which is printed within the scanned document. The retained bit map is generated with signals obtained from A/D converter 24 or decompression unit 32.

The retained bit map is input to bar code recognition unit 34. In the preferred embodiment, unit 34 comprises a programmable digital computer which is controlled in accordance with the flow diagrams shown in FIGS. 2-6 described in detail below. It is the task of unit 34 to extract from the bit map an accurate reconstruction of the bar code symbol, and to provide an output from which the information represented by the bar code symbol can be obtained. The details of how this is done follow immediately below.

Figure 2:
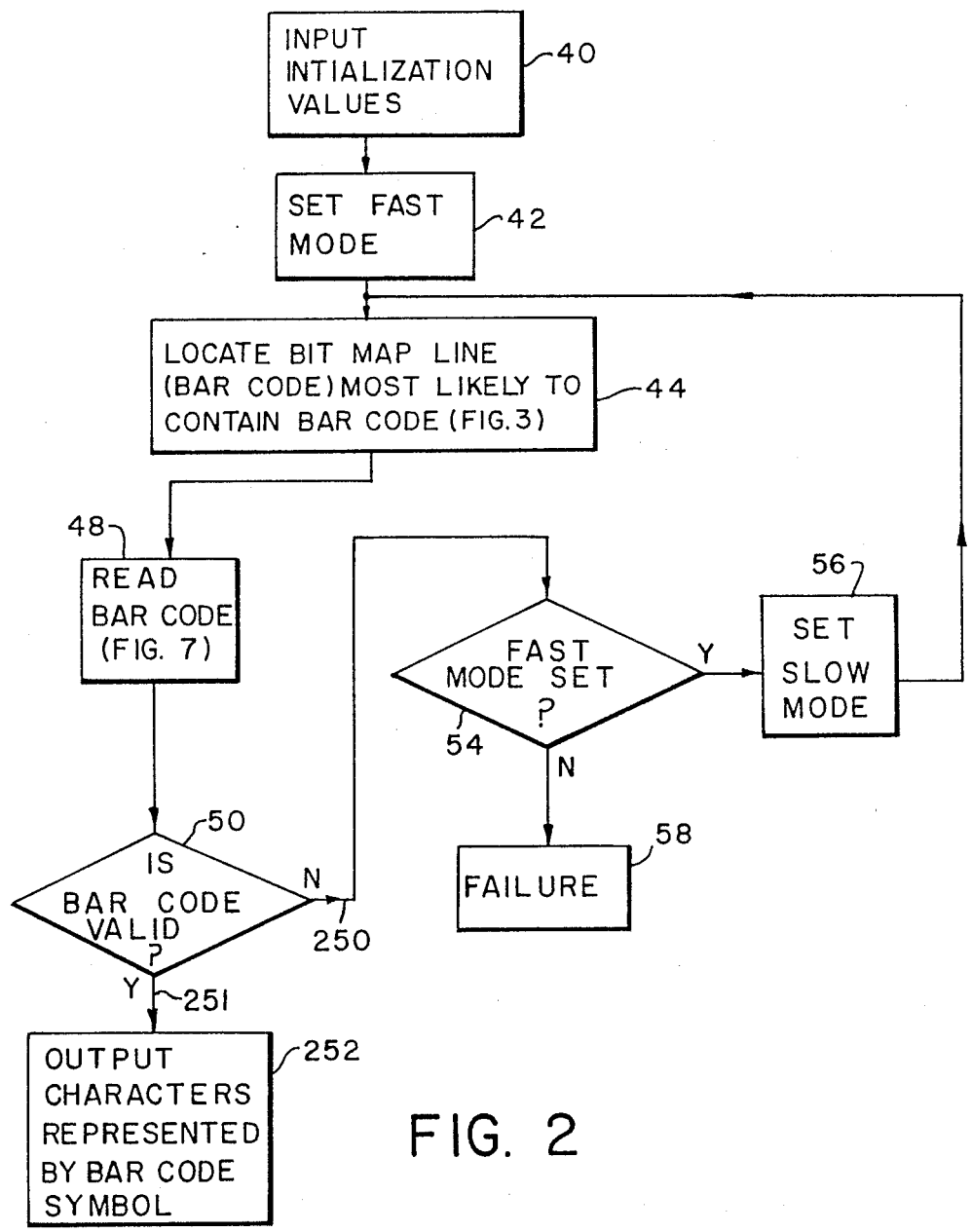
FIG. 2 is a flow diagram of the general steps utilized to perform the technique of the present invention.

The flow diagram in FIG. 2 shows the overall steps utilized to implement the technique of the present invention. Details of some of the steps are provided in the remaining Figures. When the bar code reading operation is begun, an initialization procedure is followed per step 40 to input values of various parameters which include:
Type of bar code
Maximum width of WIDE bar.
Maximum width of NARROW bar.
Minimum width of WIDE bar.
Minimum width of NARROW bar.
Number of bit map columns corresponding to width of scanned area.
Number of bit map rows corresponding to height of scanned area.
Number of bit map rows corresponding to height of bar code.
Number of bit map rows to be processed in SLOW mode.

The "type of bar code" is specified because at least some of the initialization values differ depending on the nature of the bar code. For example, the range allowed for the width of WIDE and NARROW bars depends on the type of bar code used. This range, incidentally, can be found on page 9 of the ANSI publication for the "3 of 9" bar code and on page 11 for the CODABAR bar code. The dimensions of the bit map area to be analyzed with the technique of this invention are advantageously provided because the scanned document is likely to include a substantial amount of information other than the bar code. If a bit map corresponding to the entire scanned document were to be analyzed in order to identify the location in which the bar code is stored in the bit map, this would obviously produce a slower bar code reading. Consequently, whenever possible, it is preferable to limit the area of the bit map within which this technique will search for the bar code. The smaller this area is set to be, the commensurately faster will be the bar code reading obtained because less data needs to be processed. The starting point of the area to be scanned, namely the bit corresponding to the upper, left-hand pixel can be specified along with the number of columns and rows to locate the bit map area to be analyzed, or a pre-processing step can simply clip the area of interest from the entire bit map and pass only the resulting bit map for processing by the present invention.

The preferred embodiment of the present invention is provided with a FAST mode and a SLOW mode. The former provides results relatively quickly and is, therefore, used first in case it can produce a satisfactory output. If the FAST mode fails to provide a good bar code reading, then the SLOW mode is tried. Further details on this are provided below. At this point, it suffices to say that in step 42 the FAST mode is set to be initially operative.

Initialization step 40 designates the "number of bit map rows to be processed in the SLOW mode". Various factors go into how this number is selected. More on this aspect of the invention will be provided below.

The initial task of this technique is to locate a line (called BARCODE) within the bit map that is likely to contain the bar code symbol. This is depicted by step 44 which, in actuality, involves a multiplicity of steps discussed in greater detail below with respect to the flow diagram shown in FIG. 3. The flow diagram proceeds to step 48 which processes the bar code signals stored in the BARCODE line of the bit map. Further details of how the bar code is read are provided below in the discussion of the flow diagram depicted in FIG. 7. Once the bar code data is processed with the operation depicted by step 48, the resulting output is fed to decision box 50 which determines whether the bar code data is valid. If validity of the bar code is confirmed, the bar code is output as a viable result by virtue of step 52.

If decision box 50 returns a negative answer, then decision box 54 checks whether the operation is in a FAST mode setting. If it is, then the setting is converted in step 56 to the SLOW mode. One way (not shown) of implementing the mode setting is by setting a flag the status of which is detected. Subsequent to this change in setting, the flow is routed to the beginning of step 44 and ensuing steps 48, 50, 52 and 54 described above. If, however, decision box 54 reveals that the mode setting is already SLOW by virtue of a negative answer being produced at the output of decision box 54, a failure signal is output by step 58 which indicates that no BARCODE line has been found in the bit map.

Figure 3:
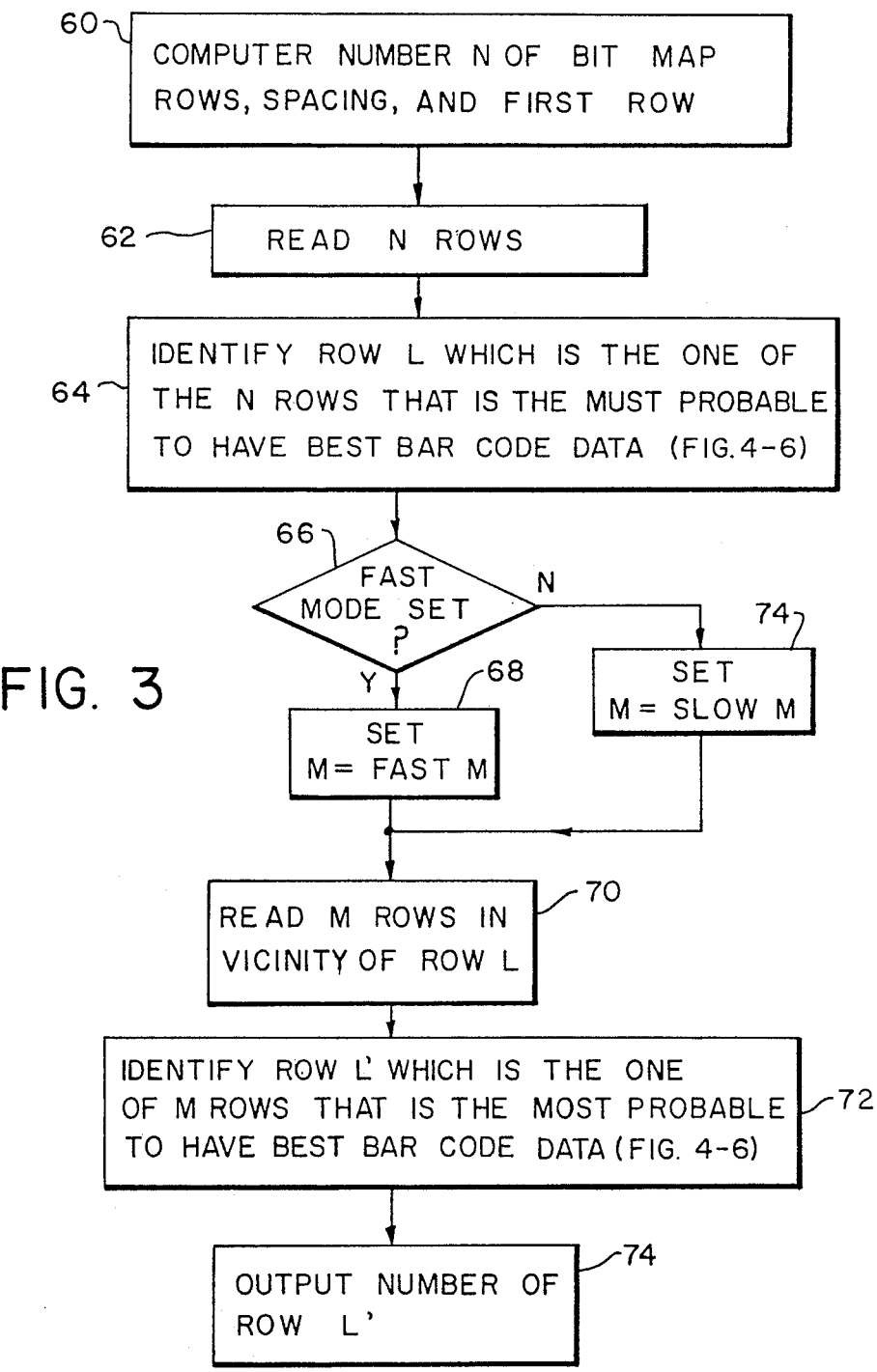
FIG. 3 is a flow diagram which explains in more detail the technique of locating the bar code data in a bit map.

FIG. 3 shows a detailed flow diagram of the procedure identified as 44 in FIG. 2 to locate the BARCODE area. As briefly explained above, the object of the locate BARCODE procedure 44 is to search for a particular row in the retained bit map which includes data that appears to be representative of a bar code symbol. Step 60 computes a number N of rows in the bit map which will be processed to obtain the information stored therein for further processing, as explained below. The number of rows N is designed to ensure that at least one of rows N corresponds to a scan line which traversed the bar code. Thus, if BH is the number of rows included within the height of the bar code along the secondary scanning direction 5, and MN is the number of rows (provided by initialization step 40) within the allotted area of the document (either the entire document or a particular specified area, as explained above), then N, the number of rows processed, is determined by the following relationship:

$$N = \frac{MN}{BH - 1}$$

Using a concrete example, if MN is 400 rows and BH is 100 rows, N is determined by 400/99, or 4 (using integer division). The interval INT between rows is determined by INT=MN/N to be 100. The initial row is determined by INT/2, which in our example turns out to be 50. Thus, the four bit-map rows to be processed will be 50, 150, 250, and 350. This approach provides a uniform spread of rows in order to ensure that one of the selected rows includes bar code data.

With the number of rows N, the increment INT between adjacent rows N, and the first row to be processed having been determined in step 60, each of rows N is sequentially processed per step 62 in order to obtain the stream of digitized data contained therein. Step 64 then utilizes the data from rows N to identify a row L which is the row that most probably corresponds to a scanline that passed through the bar code and has the "best" bar code characteristic(s). How step 64 is implemented and what bar code characteristic(s) are utilized at this juncture are discussed below with respect to the flow diagram shown in FIG. 4.

Continuing for the time being with an explanation of FIG. 3, once line L is identified, decision box 66 represents the determination of whether the operation is being carried out in a FAST mode setting. If it is, then step 68 sets a value M corresponding to a number of rows to be scanned within the vicinity of line L, as represented by FASTM. In step 70, the M rows are retrieved from the bit map. Since speed is of the essence in the FAST mode, the value of M is kept to a minimum. It can, for example, be as low as 3 with one row being above and one row being below row L. Step 72 is identical to step 64 to determine which of lines M has the "best" bar code characteristic(s). It results in the selection of a row L' from the M rows which have been processed in step 70.

If the output of decision box 66 indicates that the operation is proceeding in the SLOW mode, then step 74 sets a value for M equivalent to SLOWM. This value is significantly larger than FASTM. Steps 70 and 72 are then carried out with the large number of rows M based on SLOWM.

Selection of values for SLOWM and FASTM depends on the particular application to which this technique is put. More particularly, the tilt tolerance has a major impact on the values selected for these parameters. If it is expected that the tilt angle of the bar code relative to the scanning direction is zero, then it would hardly be necessary to scan in the vicinity of row L because the bit map data in nearby rows is highly likely to be the same as in row L. However, if a tilt is expected, then it is very evident from FIG. 1A that a significant difference can result from the particular scanning line that is analyzed. For example, scanning line 6 will provide, due to the tilt, very significantly different results from scanning line 9. Therefore, if the technique of the present invention is to have a relatively high tilt tolerance, the values of FASTM and SLOWM would be higher than those used for a lower tilt tolerance.

Another consideration in the selection of SLOWM and FASTM is the fact that the outline of the bars is not uniform. Due to "bleeding", a black line may be wider in some rows. Also, due to bar printing imperfections, a gap may result in a shrunken width. Consequently, even without tilt, different scanning lines will produce varying results.

These factors are taken into account by the operator or programmer in determining how many scanning lines should be used for SLOWM to obtain a desired degree of confidence in the results. One way to set values for these parameters is to utilize a value of 25% of the bar code height for SLOWM. In the particular example used above with the bar code height being equivalent to 100 rows, SLOWM would be 25 rows. FASTM would be taken as a percentage of SLOWM, say 20%. Thus, FASTM would be 5 rows. Some subjectivity on the part of the operator or programmer is part of the selection process for SLOWM and FASTM.

Figure 4:
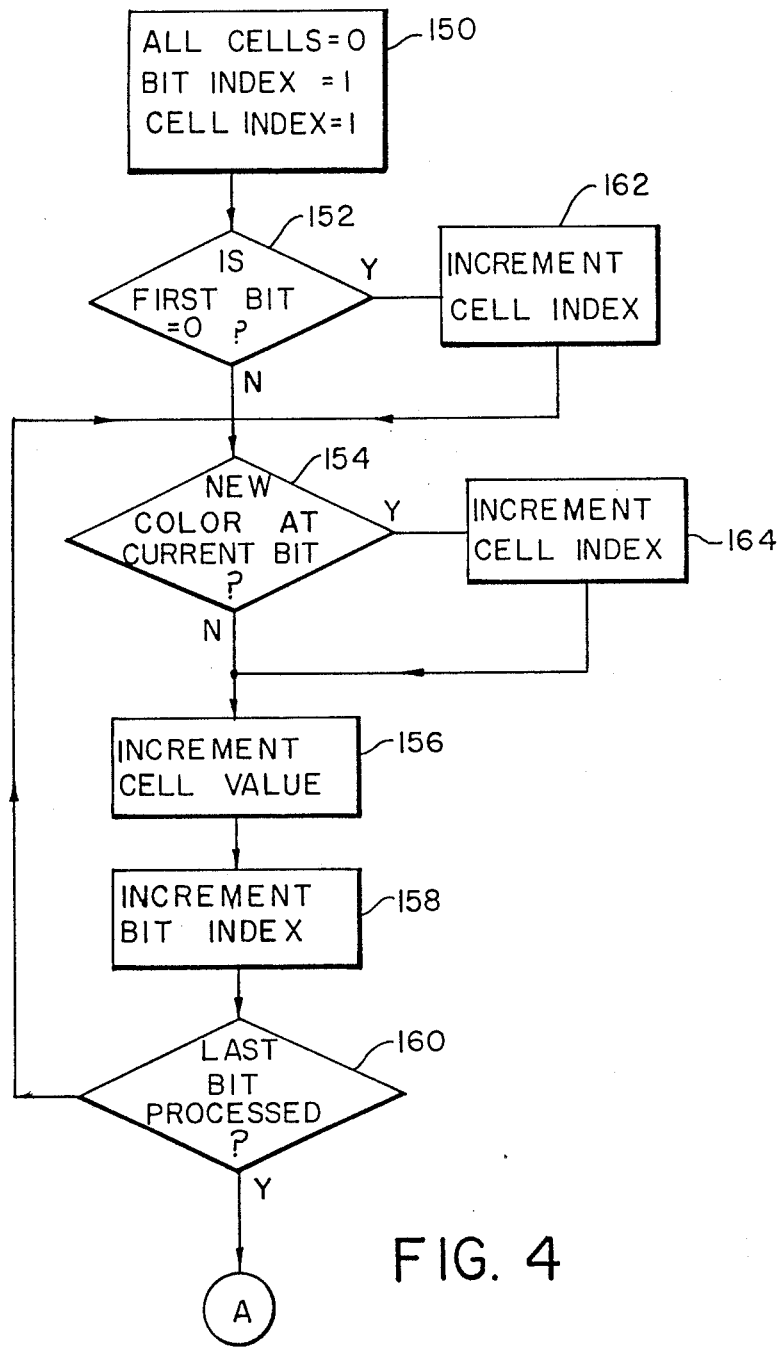
FIG. 4 is a flow diagram which shows in detail the technique of processing a particular row of the bit map to convert it into a seriew of sets, with each set consisting of contiguous bits of the same binary value.
Figure 5:
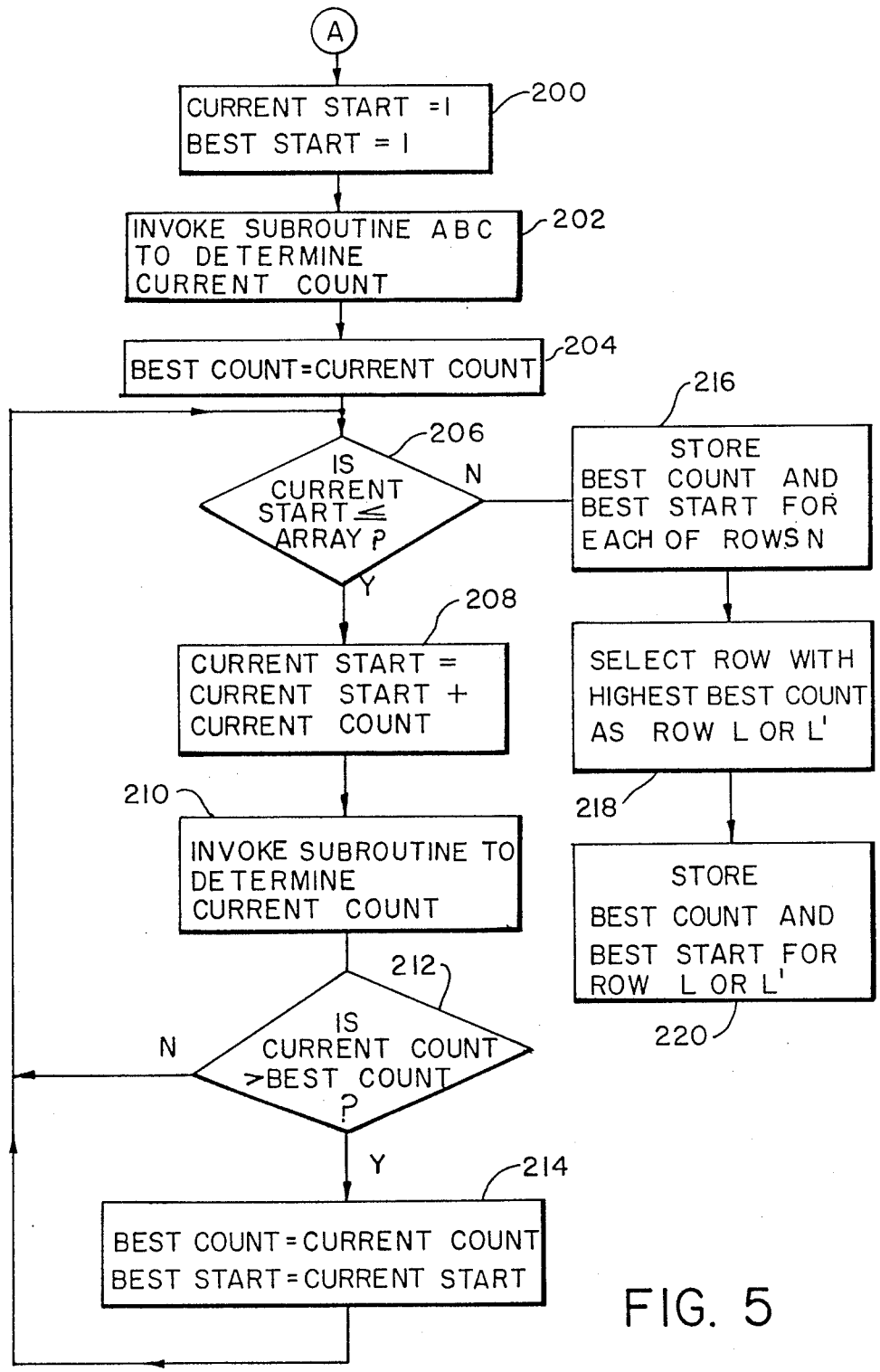
FIG. 5 is a flow diagram which shows in detail the technique of utilizing the information obtained for each row with the process described in FIG. 4 to determine the longest string of WIDE and NARROW bars, and where it begins.
Figure 6:
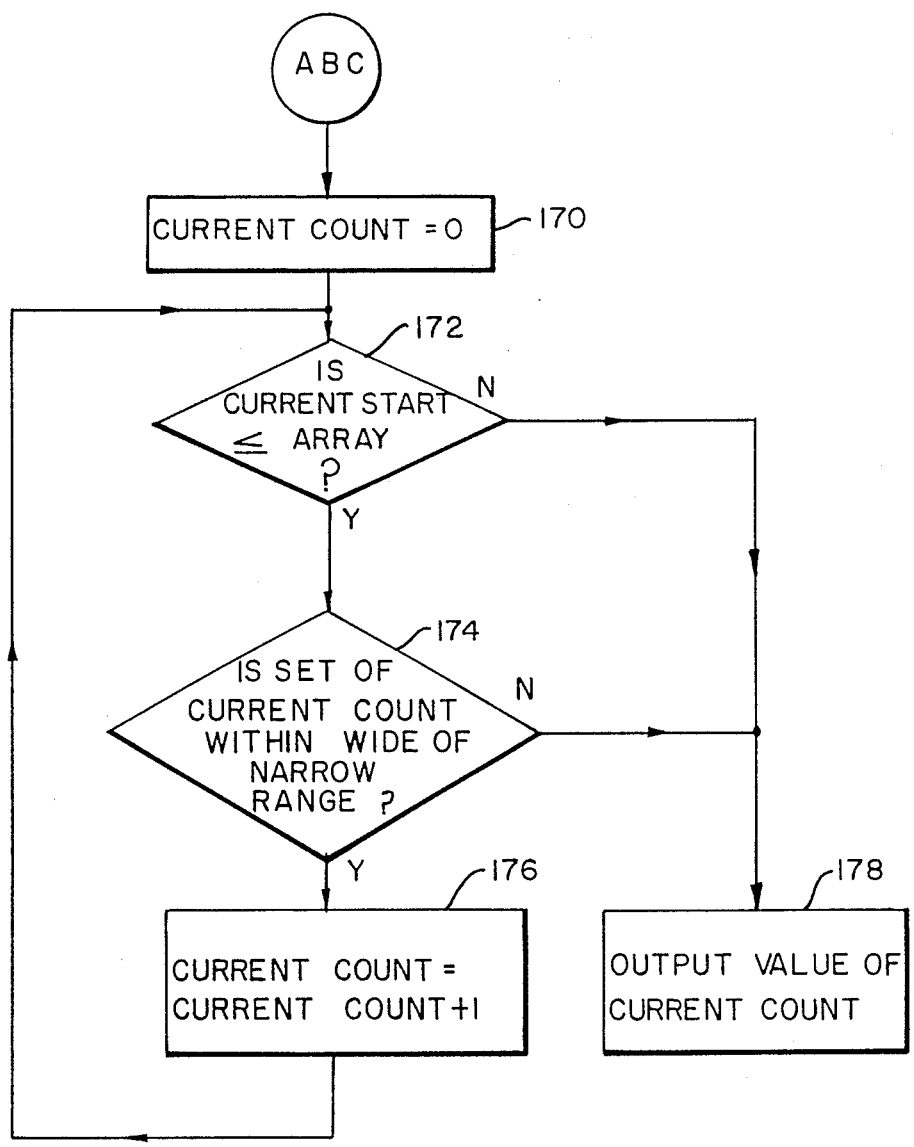
FIG. 6 is a flow diagram describing a subroutine used in the process of FIG. 5 to count the number of bars in a string of consecutive bars.

Turning now to FIGS. 4, 5 and 6, these show details of the procedure utilized for performing steps 64 and 72 shown in FIG. 3. When a bit map row is processed, a stream of 0 and 1 binary bits is obtained and separated into sets which contain only contiguous 0's and contiguous 1's. This can be represented by the following Table.

TABLE A

| Set No. | Bit | No. of contiguous bits in set | WIDE or NARROW bar? | No. of contiguous bars in string | No. of first bit in string |
|---|---|---|---|---|---|
| 1 | 1 | 6 | W | 1 | 1 |
| 2 | 0 | 3 | N | 2 | |
| 3 | 1 | 9 | W | 3 | |
| 4 | 0 | 1 | — | 0 | |
| 5 | 1 | 2 | N | 1 | 20 |
| 6 | 0 | 15 | W | 2 | |
| 7 | 1 | 11 | W | 3 | |
| 8 | 0 | 4 | N | 4 | |
| 9 | 1 | 20 | — | 0 | |
| 10 | 0 | 9 | W | 1 | 72 |
| 11 | 1 | 4 | N | 2 | |
| 12 | 0 | 4 | N | 3 | |
| 13 | 1 | 12 | W | 4 | |
| 14 | 0 | 3 | N | 5 | |
| 15 | 1 | 7 | W | 6 | |

The technique to be described below with respect to FIG. 4 first determines how many bits there are in a set of contiguous bits of the same binary value. Thus, the first set of contiguous bits having a binary value of 1 consists of a total of 6. The second set, corresponding to a "0" bit, has 3 contiguous bits. The third set, corresponding to a "1" bit, has 9 contiguous bits; and so on until the entire row in the bit map has been processed to find, in this particular instance, 15 sets. The next operation is to establish whether any of these sets corresponds to a bar code component. In particular, initialization step 40 sets a range of values for the width of the WIDE and NARROW bars. The "3" of "9" code utilizes a range of 6–18 bits for a WIDE bar, and 2–5 bits for the width of a NARROW bar. (These numbers are exemplary only. Other ranges can be adopted as long as an appropriate ratio is maintained between the WIDE and NARROW bar dimensions which is commensurate with the ANSI standard.) Utilizing these ranges, each of the sets is then analyzed as to whether it fits within either of these ranges. Thus, Set No. 1 is found to represent a WIDE bar, Set No. 2 a NARROW bar, and Set No. 3 another WIDE bar. However, Set No. 4 with only 1 "0" bit is not a bar code component. Likewise, Set No. 9 is not recognized as a bar.

The results of this operation are then utilized to identify the longest string of contiguous bars. Thus, Set Nos. 1-3 represent one such string, Set Nos. 5-8 represent another such string, while Set Nos. 10-15 represent a third such string. The longest string is, thus, determined to be 6 consisting of set Nos. 10-15. Each of the N rows is processed to determine and store the longest string of bars in it. Then, rows N are compared relative to each other, and the one with the longest string is selected as row L.

It is to be noted that a presumption is made here that the row with the longest such string is the one most likely, of the rows N, to represent the scan line which passed through the bar code. This presumption relies on the observation that images other than a bar code are extremely unlikely to have the structure and organization tracked by this technique. The bar code characteristic of a "long" string having one bar followed by another bar and so on, with the bar widths being within a relatively narrow range, just does not occur. In other words, although a regular alpha-numeric text certainly has alternating blank spaces and dark spaces along a scan line, the width of these spaces will not fit the bar width range of any bar code type other than perhaps a "short" string. Therefore, the longer the string found in a row, the more likely that row is to have the sought bar code data in it.

The memory in storage unit 30 is provided with a "column" of locations corresponding to the third column in Table A. For ease of discussion, each of these "column" locations will be referred to as a cell. Each cell is capable of retaining any two-digit number. Of course, cells capable of retaining more than two digits can be provided if needed to accomodate the bar code in a particular application.

Turning now with more specificity to FIG. 4, its explanation will be facilitated by the following exemplary chart. Only four sets (rather than 15 as shown in Table A) are shown on the chart in order to simplify the examples. Each set is represented in this chart by a cell. In Example 1, the first two bits are 1's, while the third bit is a 0. In Example 2, the first two bits are 0's while the third bit is a 1.

EXAMPLE 1

| | First Bit = 1 | Second Bit = 1 | Third Bit = 0 | | |
|---|---|---|---|---|---|
| | | 152 | 154 | 154 | |
| Step No. | 150 | 156 | 156 | 164 | 156 |
| Set No. | | | | | |
| 1 | →0 | →1 | →2 | 2 | 2 |
| 2 | 0 | 0 | 0 | →0 | →1 |
| 3 | 0 | 0 | 0 | 0 | 0 |
| 4 | 0 | 0 | 0 | 0 | 0 |

EXAMPLE 2

| | First Bit = 0 | Second Bit = 0 | Third Bit = 1 | | | |
|---|---|---|---|---|---|---|
| | | 152 | | 154 | 154 | |
| Step No. | 150 | 162 | 156 | 156 | 164 | 156 |
| Set No. | | | | | | |
| 1 | →0 | 0 | 0 | 0 | 0 | 0 |
| 2 | 0 | →0 | →1 | →2 | 2 | 2 |
| 3 | 0 | 0 | 0 | 0 | →0 | →1 |
| 4 | 0 | 0 | 0 | 0 | 0 | 0 |

Initialization step 150 sets to zero the value in all of the memory cells allocated for processing the current row. This is shown on the chart in the column labeled "150". The technique also makes use of a bit index and a cell index. The bit index keeps track of the number of the bit which is being processed in the line. Likewise, the cell index keeps track, or points to, the cell into which data is to be input. Both of these indexes are set to 1.

Decision box 152 represents a determination of whether the value of the first bit is a zero. Table A and the chart show that the value of the first bit is a "1". Consequently, the negative answer output by decision box 152 leads to decision box 154 which determines whether the current bit (i.e. bit No. 1) represents a pixel of the same color or a different color from the pixel represented by the preceding bit. This determination is made by comparing the binary value of the current bit with the previous bit. If decision box 162 determines that both bits represent the same color, or if the current bit is the first bit in the line, then the value in the first cell is incremented by one as per step 156 which increments the value within the first cell. The column headed "152/156" in the chart shows this result in the cell to which an arrow (representing the cell index) points. Step 158 then increments the bit index from 1 to 2 in order to process the second bit in the line. Decision box 160 then determines whether the end of the line has been reached. If it has not, then the process returns to decision box 154. As long as the color of the pixel represented by the current bit remains unchanged from the previous one, the routine continues in the loop consisting of steps 154, 156, 158, 160, and back to 154. The processing of the second bit is represented in the 154/156 column which now contains a value of 2 in the first cell.

When decision box 154 senses a new color(as for the third bit in the chart), it leads to step 164 which increments the cell index by one. Thus, the pointer arrow in the chart is shifted from the first cell to the second cell represented by set No. 2 in Table A. The cell value of the second cell is then incremented by one with step 156, as is demonstrated in the "156" column of the chart. Again, as long as the color remains unchanged, the value in the second cell continues to be incremented by one for each pass as long as the routine remains in the above-mentioned loop.

If the first bit in the line currently being processed happens to be a 0 rather than a 1, decision box 152 leads to step 162 which increments the cell index by 1, as shown by the arrow in the "152/162" column of the chart. Consequently, the value in the first cell remains at its initialized value of 0. The cell index thus directs the data resulting from subsequent processing into the second cell. The remainder of Example 2 shown in the chart is self-explanatory in view of what has been explained above regarding Example 1. The object of utilizing decision box 152 in combination with step 162 is to ensure that the odd-numbered cells contain 1-bit information, while the even-numbered cells contain 0-bit information. An advantage of keeping track of respective bit-type data is the added flexibility of handling bar code types with different width criteria for dark bars and space bars. In other words, decision box 174 in FIG. 6 can be operated with ranges specific to each bit type, as explained below.

At the conclusion of the processing depicted by FIG. 4, namely at the positive output of decision box 160, 15 memory cells have been provided with the information shown in the third column of Table A. In other words, the bit-by-bit information stored in each line of the bit map has now been converted into a sequence of 15 sets. Of course, the number of sets likely varies from line to line. The term "ARRAY" is used below to refer to the number of sets in a particular line. Thus, in one line the array may consist of 15 sets while in another line it may consist of 11, 23, or any number, even 1 if the entire line is blank or dark.

With the bit map line having now been divided into sets, the technique of the present invention turns to classifying each set as representing either a WIDE or NARROW bar, or as being neither. Once the bars in the line have been identified, each string of contiguous bars is processed to determine at which set it starts (CURRENTSTART) and its length (CURRENTCOUNT). The length of the longest string (BESTCOUNT) and the set which starts it (BESTSTART) are also determined. The values of CURRENTCOUNT and BESTSTART are initialized at 1 in step 200 of FIG. 5. Step 202 then invokes subroutine ABC depicted in FIG. 6. The following discussion digresses now to FIG. 6.

In initialiation step 170, the value of CURRENTCOUNT is set to 0. The value of CURRENTSTART is also at 0, to which value it was set by step 200 in FIG. 5, as explained above. Decision box 172 determines whether the CURRENTSTART, namely the number of the first set in the current string being examined, is less than ARRAY which, as explained above, is the number of sets previously identified per FIG. 4 in the line being processed. A positive answer leads to decision box 174 which determines whether the set identified by the value of CURRENTCOUNT, namely 1 in the example now being described, includes a contiguous number of bits which falls within the range of a WIDE or NARROW bar. If the CURRENTCOUNT set is found to correspond with a WIDE or NARROW bar, then the value of CURRENTCOUNT is incremented by 1 with step 176. This leads the process to the examination of set No. 2 by decision box 174. If, as shown in Table A, set No. 2 also falls within the range of a WIDE or NARROW bar, then the value of CURRENTCOUNT is again incremented by 1; and likewise for set No. 3. However, for set No. 4 of Table A, decision box 174 outputs a negative response. At this point, the value of CURRENTCOUNT is 3 while the value of CURRENTSTART is still at its initialized 1. This value of CURRENTCOUNT is output by step 178 whenever either of decision boxes 172 or 174 generates a negative response.

Returning now to FIG. 5, by invoking routine ABC for the first time, the value of CURRENTCOUNT using the example in Table A is determined to be 3. Step 204 sets the value of BESTCOUNT to be the same as the just-determined value of CURRENTCOUNT. BESTCOUNT corresponds to the longest identified string. At this point of the processing, the longest string is, of course, the first string, namely 3.

Decision box 206 decides whether the processing is still on the line being processed by determining whether the number of the set starting the string being examined (i.e. CURRENTSTART) is within the number of sets (i.e. ARRAY) found by the routine discussed above with respect to FIG. 4. If CURRENTSTART is within the line, then step 208 initiates the next stage by setting CURRENTSTART to the sum of the present value of CURRENTSTART and CURRENTCOUNT. In the Table A example which we are using for explanatory purposes, the value of CURRENTSTART is 1, as initialized in step 200. The value of CURRENTCOUNT has been calculated above to be 3. Consequently, the new value of CURRENTSTART per step 208 is 4, which corresponds to the next set number to be examined since previously only the first three sets were processed by subroutine ABC.

Step 210 again invokes the ABC routine of FIG. 6 to determine a CURRENTCOUNT value for the next string. Returning now to FIG. 6, box 170 sets the value of CURRENTCOUNT to 0. Decision box 172 then checks that CURRENTSTART (which was updated in step 208 of FIG. 5) is still within the line being processed. If it is, then decision box 174 determines whether this set corresponds to a WIDE or NARROW bar. In the Table A example, set No. 4 is not a bar. Consequently, the value of CURRENTCOUNT remains at 0. This value of 0 is output by step 178, and is utilized by decision box 212 of FIG. 5 to determine whether CURRENTCOUNT exceeds BESTCOUNT. The consequent negative answer returns the process to decision box 206. After passing through decision box 206, step 208 updates the value of CURRENTSTART to 5. Subroutine ABC of FIG. 6 is again invoked by step 210. Returning once more to FIG. 6, the value of CURRENTCOUNT is set to 0 by step 170, and decision box 172 leads to decision box 174. The processing will loop four times through step 176 (corresponding to the Table A example), so that the value of CURRENTCOUNT after set No. 8 is processed is equal to 4. When set No. 9 is processed, decision box 174 causes step 178 to provide this value of 4 via step 210 of FIG. 5 to decision box 212. Note should be taken that CURRENTCOUNT is equal to 4 while the previously stored value for BESTCOUNT is 3. Consequently, a positive output is generated by decision box 212 thereby leading to step 214 which simply updates the values of BESTCOUNT and BESTSTART with the respective values of CURRENTCOUNT (from step 210) and CURRENTSTART (from step 208).

Following a similar sequence, when the processing of set No. 15 is concluded, the value of CURRENTCOUNT generated by step 210 is 6. Consequently, this value will replace the previously stored BESTCOUNT value by virtue of step 214. A new BESTSTART value will also be stored. Upon processing of this line being completed, decision box 206 will generate a negative output leading to step 216 which stores the BESTSTART and BESTCOUNT values for that particular line. The same parameters are also obtained for each of lines N. Thus, with the conclusion of the operations depicted in FIGS. 4, 5 and 6, each of lines N has been processed to yield its longest string, and the set number at which such string began.

Step 218 in FIG. 5 selects the highest BESTCOUNT of the values determined for all of rows N, and selects the row with the highest BESTCOUNT. This is row L upon completion of step 64 or row L' upon completion of step 72 in FIG. 3. Step 220 stores BESTCOUNT and BESTSTART for row L or L', as appropriate. Steps 216, 218 and 220 can be carried out by storing the BESTCOUNT and BESTSTART values, as identified by row, in step 216. Step 218 then compares the BESTCOUNT values obtained for all of the rows, and selects the highest one. Step 220 then stores the identity of the row with the highest BESTCOUNT. Alternatively, and in accordance with the preferred embodiment, step 216 obtains the BESTCOUNT and BESTSTART values generated for each of rows N, but does not store them. Instead, the value of BESTCOUNT for each row is fed to step 218 which operates in a manner similar to steps 212 and 214. In other words, a value of BESTCOUNT is only retained if it is higher than one previously stores. Whereas steps 212 and 214 perform this function during the intra-row processing of an individual row, step 218 does so for inter-row processing.

Figure 7:
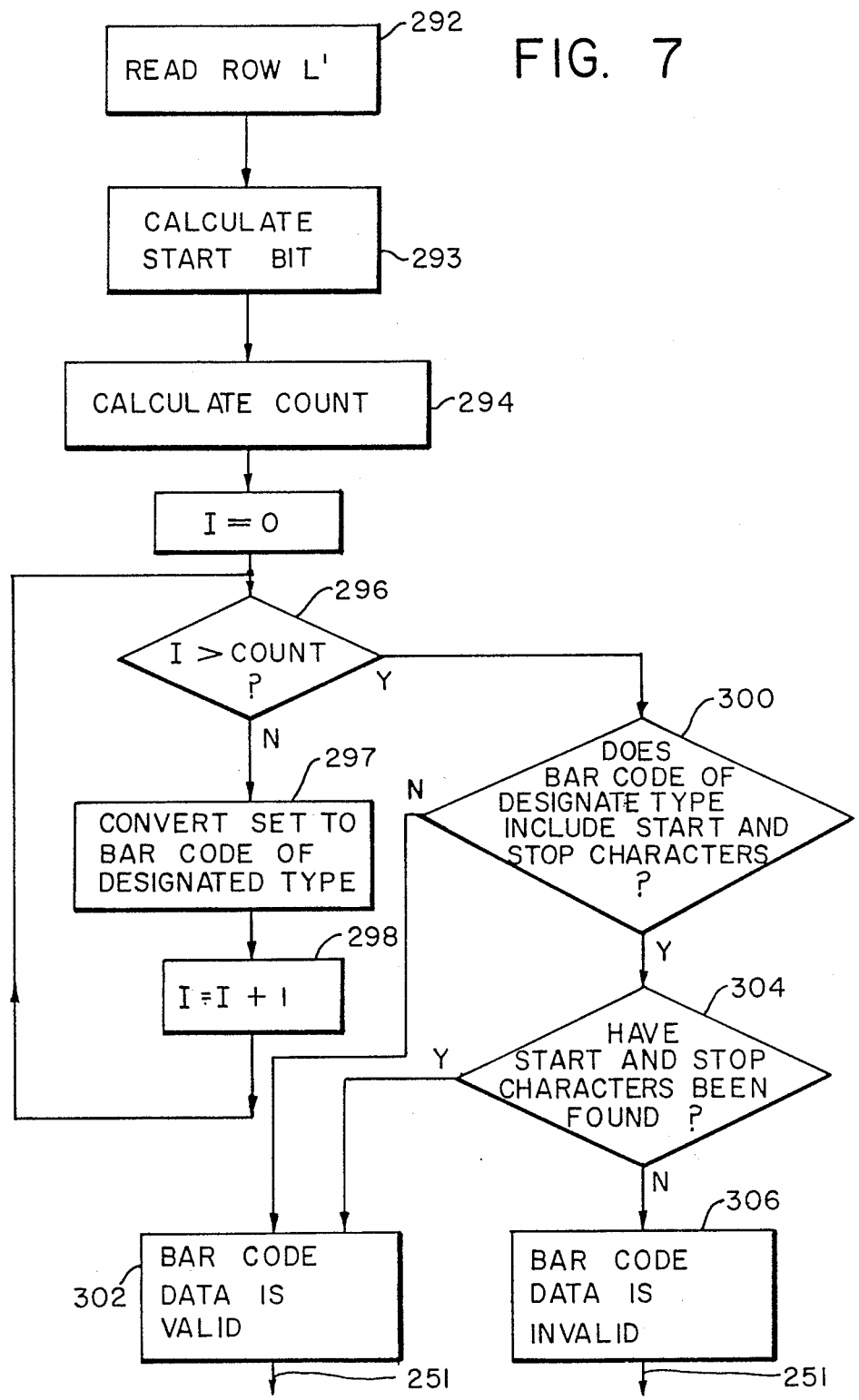
FIG. 7 is a flow diagram which shows in detail the technique of reading a bar code stored within a bit map.

Once row L' has been identified, the object is to use it in order to process the bar code. This operation is depicted in FIG. 7. Step 292 retrieves row L' from the bit map in a form corresponding to the third column of Table A. This can be obtained either by having retained this information in memory from the previous processing of rows N or, alternatively, re-processing row L' in accordance with the routine of FIG. 4. Step 293 then calculates the value of STARTBIT. STARTBIT is the first bit of the string identified by the BESTCOUNT and BESTSTART parameters. Specifically, BESTSTART has been determined to be set No. 10. Thus, STARTBIT is caluclated by adding the number of bits in each of set numbers 1–9, and incrementing the result by 1. When completed, step 293 produces a value for STARTBIT of 72.

Once the STARTBIT has been identified as 72, step 294 calculates a value for COUNT to identify the last bit of the longest string in row L'. This is done by combining the number of bits in set Nos. 10–15, and adding the result to STARTBIT minus 1, to produce 111.

The processing of row L' continues with decision box 296 which determines whether bit I is within the longest string by comparing it with COUNT. If it is, then step 297 depicts the process of converting each of sets 10–15 to the appropriate bar type, e.g. WIDE or NARROW. When one of these sets have been so converted, step 298 sequences the process to the next set. This continues until decision box 296 determines that the length (i.e. COUNT) of the longest string has been exceeded.

FIG. 7 depicts the detailed steps for implementing box 48 in FIG. 2. At this point, with row L' being identified, the operation is ready to interpret the bar code data and provide a meaningful output corresponding to the information which the bar code symbol represents. As explained above, a number of different types of bar codes are generally known and used. At least some are identified in Appendix B of the above-mentioned HANDBOOK OF BARCODING SYSTEMS. The present invention has been implemented specifically only for the "3" of "9" type and the CODABAR type of bar codes. However, it is believed that the invention is compatible with all the known types of bar codes.

In the procedure represented by decision box 300, a determination is made based on the type of bar code designated by step 40, whether start-and/or-stop characters are utilized. Such start-and/or-stop characters are utilized to define beginning portion 21 and/or end portion 22 of the bar code. If the chosen type of bar code does not utilize start-and/or-stop characters, then decision box 300 leads to step 302. It produces a signal on line 251 (see FIG. 2) which indicates and confirms that the bar code data obtained in step 297 is valid. If, however, decision box 300 indicates that the chosen type of bar code does utilize start-and/or-stop characters, then the procedure represented by decision box 304 determines whether the expected break characters have been found by step 297. If they have, then decision box 304 routes the flow to above-mentioned step 302. If, however, the expected break characters have not been found, then decision box 304 routes the flow to step 306 which provides an indication of bar code data invalidity on line 250 (see FIG. 2).

The code obtained in step 297 is then converted in step 252 by way of a lookup table, for example, to the characters which the printed bar code symbol represents. The output of step 252 can be in the form of the well known ASCII signals. This is a straightforward procedure about which further details are not deemed necessary.

Although a preferred embodiment of the present invention has been disclosed in detail above, a number of variations thereof and modifications thereto will be readily apparent to one with ordinary skill in the art. For example, in carrying out step 44 as detailed in FIGS. 4–6, it is not necessary to classify a set as WIDE or NARROW, just to indicate a "hit" when the set falls in the designated range of either. Thus, the "WIDE or NARROW bar?" column in Table A would have a YES or NO for each set rather than a WIDE or NARROW. Also, in this connection, it would not be necessary to keep track of 0 BIT-Type as distinguished from 1 BIT-Type data. The advantage of using individual sets, however, is the added flexibility of handling bar code types with different width criteria for dark bars and space bar and for WIDE bars and NARROW bars. Furthermore, the technique of identifying a line L described above can be replaced with a technique for locating an area in the bit map which includes a high number of "black" pixels. For example, a filtering technique can be used for obtaining the outline of such an area, and a line would then be passed through such area. These and other such modifications are intended to fall within the scope of the present invention as defined by the following claims.

We claim:

1. A bar code apparatus for processing digitized bar code data stored electronically in bit map form and representative of a bar code having parallel bar code components including alternating dark bars and blank spaces carried on a light reflective surface, said bar code data being obtained by scanning said surface in lines along a primary scanning direction substantially perpendicular to the bar code components and at a resolution of a predetermined number of pixels per unit length to generate for a line of said pixels respective bar code signals having values related to the amount of light reflected by said dark bars and blank spaces, respectively, and scanning in a secondary scanning direction substantially perpendicular to said primary scanning direction to traverse a plurality of said scanning lines at a resolution of a predetermined number of lines per unit length, said bit map being produced from said bar code signals and having a plurality of bits arranged in rows, said rows corresponding, respectively, to the scanning lines, and the bits in each row corresponding to the pixels in a corresponding one of said scanning lines, the bit map bits having a bit value related to the bar code signal value of the corresponding pixels; said apparatus comprising:

memory means for storing assigned bar code component data related to a number of bits allotted, respectively, in a row of said bit map to said bar code components;

means for comparing the bit map with the stored bar code component data to identify said bar code components in said bit map; and conversion means for providing from said identified bar code components a bar code reading result for converting the bar code to the message it represents.

2. The bar code reading apparatus of claim 1, wherein the assigned bar code component data includes a range of bits allotted to at least one of said preselected bar code components for a dimension extending along said primary scanning direction.

3. The bar code reading apparatus of claim 1, wherein the comparing means comprises counting means for identifying sets of bits in a bit map row, with each set consisting of a number of contiguous bits of the same value, and means to count the number of contiguous bits in each set.

4. The bar code reading apparatus of claim 1, wherein the conversion means comprises means for indicating whether all bar code components in the bar code corresponding to the entire message information carried on the surface have been identified.

5. The bar code reading apparatus of claim 1, wherein said bit map includes rows with data corresponding to other than said selected message information, said comparing means includes means for locating at least one row in the bit map into which bar code component data corresponding to the coded version of the selected message information has been stored.

6. The bar code reading apparatus of claim 5, wherein said row locating means comprises means for counting a string of consecutive bar code components identified by said comparing means for each of at least two rows of the bit map, and selecting the row with the longest string.

7. The bar code reading apparatus of claim 6, wherein said row locating means comprises means for designating said at least two rows of the bit map based on a dimension of the bar code components in the secondary scanning direction relative to the number of rows in the bit map.

8. The bar code reading apparatus of claim 7, where the designating means follows the relationship $N=N=MN/(BH-1)$, where N is the number of designated rows, MN is the number of rows in the bit map, and BH is said dimension of the bar code in the secondary direction, as expressed in rows.

9. The bar code reading apparatus of claim 8, wherein the spacing between the at least two designated rows is chosen based on the relationship $INT=MN/N$, where INT is said spacing expressed in rows.

10. The bar code reading apparatus of claim 9, wherein the first row of the at least two designated rows is chosen by the choosing means to be $INT/2$.

11. The bar code reading apparatus of claim 6 wherein said row locating means comprises further means for designating additional rows in the bit map vicinity of the selected row, and for determining whether any of the additional designated rows includes a longer string than the longest string found in said at least two designated rows and, if so, selecting such additional row.

12. The bar code reading apparatus of claim 11, wherein said row locating means includes confirming means for indicating whether all bar code components corresponding to the entire message information in the bar code carried on the surface have been identified.

13. The bar code reading apparatus of claim 12, wherein said further means chooses an initial number A of additional designated rows and, if said confirming means indicates a failure, it chooses a number B of additional designated rows, with $B>A$.

14. The bar code reading apparatus of claim 13, wherein said additional designated rows include at least one above and at least one below said selected row.

15. The bar code reading apparatus of claim 6, wherein said conversion means includes means for processing only bits stored in the longest string of the selected row.

16. Apparatus for determining a bar code from a bit map obtained by a plurality of optically scanned lines of a light reflective surface area, at least part of which carries said bar code having components including alternating dark bars and blank spaces representative of selected message information, and scanned with a resolution of a predetermined number of pixels per unit length to input data into said bit map related to light reflected by respective pixels of said surface, said bit map having a plurality of bits arranged in rows, said rows corresponding, respectively, to the scanning lines, and the bits in each row corresponding to the pixels in a corresponding one of said scanning lines, comprising:
means for storing assigned bar code component data related to a number of bits allotted, respectively, in a row of said bit map to said bar components;
means for designating at least two rows in said bit map;
means for comparing the at least two designated rows with said assigned bar code component data to provide an identified bar code component signal;
means coupled to the comparing means for identifying the longest string of consecutive bar code components for each of said designated rows;
means for selecting whichever of said designated rows has the longest string of consecutive bar code components; and
means coupled to the selecting means for obtaining a bar code reading result from the selected designated row for converting the bar code to said selected message information.

17. The apparatus of claim 16, wherein the bar code has a given height in a direction substantially perpendicular to said scanned lines of pixels and said bit map having rows with data corresponding to other than said selected message information, said designating means comprising means for setting the location of, and spacing between, said at least two designated rows to have at least one of such rows coincide with a row in the bit map having data representing said bar code stored therein which corresponds to the selected message information.

18. The bar code reading apparatus of claim 17, wherein the assigned bar code component data includes a range of bits allotted to at least one of said preselected bar code components for a dimension extending along said scanning lines.

19. The bar code reading apparatus of claim 18, wherein the comparing means comprises counting means for identifying sets of bits in a bit map row, with each set consisting of a number of contiguous bits of the same value, and means to count the number of contiguous bits in each set.

20. The bar code reading apparatus of claim 19, wherein said conversion means comprises means to generate a match signal when coincidence is found between the number of bits in a set and said assigned bar code component data, and means for relating a particular match signal to a particular bar code component to produce said identified bar code component signals.

21. The bar code reading apparatus of claim 16, wherein said row designating means comprises means for designating said at least two rows of the bit map based on the number of rows in the bit map relative to a dimension of the bar code components in a direction perpendicular to the scanning lines.

22. The bar code reading apparatus of claim 21, where the designating means follows the relationship N=MN/(BH-1), where N is the number of designated rows, MN is the number of rows in expressed in rows, in a direction perpendicular to the scanning lines.

23. The bar code reading apparatus of claim 22, wherein the spacing between the at least two designated rows is chosen based on the relationship INT=MN/N, where INT is said spacing expressed in rows.

24. The bar code reading apparatus of claim 23, wherein the first row of the at least two designated rows is chosen by the choosing means to be INT/2.

25. The bar code reading apparatus of claim 24, wherein said row designating means comprises further means for designating additional rows in the bit map vicinity of the selected row, and for determining whether any of the additional designated rows includes a longer string than the longest string found in said at least two designated rows and, if so, selecting such additional row.

26. The bar code reading apparatus of claim 25, wherein said row designating means includes confirming means for indicating whether all bar code components corresponding to the entire message information in the bar code carried on the surface have been identified.

27. The bar code reading apparatus of claim 26, wherein said further means chooses an initial number A of additional designated rows and, if said confirming means indicates a failure, it chooses a number B of additional designated rows, with B>A.

28. The bar code reading apparatus of claim 27, wherein said additional designated rows include at least one above and at least one below said selected row.

29. The apparatus of claim 16, further comprising means for retrieving from the bit map at least one additional row in the vicinity of said selected designated row; said comparing means, identifying means, and selecting means providing a processed designated row indicative of whether the at least one additional row includes a string of consecutive bar code components longer than in said selected designated row.

30. The bar code reading apparatus of claim 16, wherein said conversion means includes means for processing only bits stored in the longest string of the selected row.

31. A bar code reading apparatus comprising:
means for optically detecting a bar code with which selected message information has been converted into a coded version, said bar code having parallel bar code components including alternating dark bars and blank spaces carried on a light reflective surface, said detecting means scanning said surface in lines along a primary scanning direction substantially perpendicular to the bar code components and at a resolution of a predetermined number of pixels per unit length to generate for a line of said pixels respective bar code signals having values related to the amount of light reflected by said dark bars and blank spaces, respectively, said detecting means moving in a secondary scanning direction substantially perpendicular to said primary scanning direction to traverse a plurality of said scanning lines at a resolution of a predetermined number of lines per unit length;
means coupled to the detecting means for producing from said bar code signals a bit map having a plurality of bits arranged in rows, said rows corresponding, respectively, to the scanning lines, and the bits in each row corresponding to the pixels in a corresponding one of said scanning lines, the bit map bits having a bit value related to the bar code signal value of the respective corresponding pixels;
memory means for storing assigned bar code component data related to a number of bits allotted, respectively, in a row of said bit map to said bar code components;
means for comparing the bit map with the stored bar code component data to identify said bar code components in said bit map; and
conversion means for providing from said identified bar code components a bar code reading result for converting the bar code to said selected message information.

32. The bar code reading apparatus of claim 31, wherein said detecting means comprises an analog signal generating means for providing an output signal having an amplitude related to the amount of light reflected by the bar code components, and means for digitizing said output signal for each of said pixels to be input to the bit map.

33. The bar code reading apparatus of claim 31, wherein said bit map producing means comprises a memory having addressable memory locations corresponding to bits in said bit map.

34. The bar code reading apparatus of claim 31, wherein the assigned bar code component data includes a range of bits allotted to at least one of said preselected bar code components for a dimension extending along said primary scanning direction.

35. The bar code reading apparatus of claim 31, wherein the comparing means comprises counting means for identifying sets of bits in a bit map row, with each set consisting of a number of contiguous bits of the same value, and means to count the number of contiguous bits in each set.

36. The bar code reading apparatus of claim 35, wherein said conversion means comprises means to generate a match signal when coincidence is found between the number of bits in a set and said assigned bar code component data, and means for relating a particular match signal to a particular bar code component to produce said identified bar code component signals.

37. The bar code reading apparatus of claim 31, wherein the conversion means comprises means for indicating whether all bar code components in the bar code corresponding to the entire message information carried on the surface have been identified.

38. The bar code reading apparatus of claim 31, wherein the conversion means includes validating means to confirm whether all the identified bar code components in each processed row of the bit map correspond to a valid bar code.

39. The bar code reading apparatus of claim 31, wherein said bit map includes rows with data corresponding to other than said selected message information, said comparing means includes means for locating at least one row in the bit map into which bar code component data corresponding to the coded version of the selected message information has been stored.

40. The bar code reading apparatus of claim 39, wherein said row locating means comprises means for counting a string of consecutive bar code components identified by said comparing means for each of at least two rows of the bit map, and selecting the row with the longest string.

41. The bar code reading apparatus of claim 40, wherein said row locating means comprises means for designating said at least two rows of the bit map based on a dimension of the bar code components in the secondary scanning direction relative to the number of rows in the bit map.

42. The bar code reading apparatus of claim 41, where the designating means follows the relationship N=MN/(BH-1), where N is the number of designated rows, MN is the number of rows in the bit map, and BH is said dimension of the bar code in the secondary direction, as expressed in rows.

43. The bar code reading apparatus of claim 42, wherein the spacing between the at least two designated rows is chosen based on the relationship INT=MN/N, where INT is said spacing expressed in rows.

44. The bar code reading apparatus of claim 43, wherein the first row of the at least two designated rows is chosen by the choosing means to be INT/2.

45. The bar code reading apparatus of claim 40, wherein said row locating means comprises further means for designating additional rows in the bit map vicinity of the selected row, and for determining whether any of the additional designated rows includes a longer string than the longest string found in said at least two designated rows and, if so, selecting such additional row.

46. The bar code reading apparatus of claim 45, wherein said row locating means includes confirming means for indicating whether all bar code components corresponding to the entire message information in the bar code carried on the surface have been identified.

47. The bar code reading apparatus of claim 46, wherein said further means chooses an initial number A of additional designated rows and, if said confirming means indicates a failure, it chooses a number B of additional designated rows, with B>A.

48. The bar code reading apparatus of claim 47, wherein said additional designated rows include at least one above and at least one below said selected row.

49. The bar code reading apparatus of claim 40, wherein said conversion means includes means for processing only bits stored in the longest string of the selected row.

50. A method for processing digitized bar code data stored electronically in bit map form and representative of a bar code having parallel bar code components including alternating dark bars and blank spaces carried on a light reflective surface, said bar code data being obtained by scanning said surface in lines along a primary scanning direction substantially perpendicular to the bar code components and at a resolution of a predetermined number of pixels per unit length to generate for a line of said pixels respective bar code signals having values related to the amount of light reflected by said dark bars and blank spaces, respectively, and scanning in a secondary scanning direction substantially perpendicular to said primary scanning direction to traverse a plurality of said scanning lines at a resolution of a predetermined number of lines per unit length, said bit map being produced from said bar code signals and having a plurality of bits arranged in rows, said rows corresponding, respectively, to the scanning lines, and the bits in each row corresponding to the pixels in a corresponding one of said scanning lines, the bit map bits having a bit value related to the bar code signal value of the corresponding pixels; said method comprising the steps of:

storing assigned bar code component data related to a number of bits allotted, respectively, in a row of said bit map to said bar code components;

comparing the bit map with the stored bar code component data to identify said bar code components in said bit map; and providing from said identified bar code components a bar code reading result for converting the bar code to the message it represents.

51. A method for determining a bar code from a bit map obtained by a plurality of optically scanned lines of a light reflective surface area, at least part of which carries said bar code having components including alternating dark bars and blank spaces representative of selected message information, and scanned with a resolution of a predetermined number of pixels per unit length to input data into said bit map related to light reflected by respective pixels of said surface, said bit map having a plurality of bits arranged in rows, said rows corresponding, respectively, to the scanning lines, and the bits in each row corresponding to the pixels in a corresponding one of said scanning lines, comprising the steps of:

storing assigned bar code component data related to a number of bits allotted, respectively, in a row of said bit map to said bar components;

designating at least two rows in said bit map;

comparing the at least two designated rows with said assigned bar code component data to provide an identified bar code component signal;

identifying the longest string of consecutive bar code components for each of said designated rows;

selecting whichever of said designated rows has the longest string of consecutive bar code components; and obtaining a bar code reading result from the selected designated row for converting the bar code to said selected message information.

52. A method for reading a bar code comprising the steps of:

optically detecting a bar code with which selected message information has been converted into a coded version, said bar code having parallel bar code components including alternating dark bars and blank spaces carried on a light reflective surface, said surface being scanned in lines along a primary scanning direction substantially perpendicular to the bar code components and at a resolution of a predetermined number of pixels per unit length to generate for a line of said pixels respective bar code signals having values related to the amount of light reflected by said dark bars and blank spaces, respectively, said scanning also moving in a secondary scanning direction substantially perpendicular to said primary scanning direction to traverse a plurality of said scanning lines at a resolution of a predetermined number of lines per unit length;

producing from said bar code signals a bit map having a plurality of bits arranged in rows, said rows corresponding, respectively, to the scanning lines, and the bits in each row corresponding to the pixels in a corresponding one of said scanning lines, the bit map bits having a bit value related to the bar code signal value of the respective corresponding pixels;

storing assigned bar code component data related to a number of bits allotted, respectively, in a row of said bit map to said bar code components;

comparing the bit map with the stored bar code component data to identify said bar code components in said bit map; and providing from said identified bar code components a bar code reading result for converting the bar code to said selected message information.

* * * * *